US Patent  [19]  [11] Patent Number: 4,709,909
Duncan et al.  [45] Date of Patent: Dec. 1, 1987

[54] RETENTION STRAP IN A GRID ASSEMBLY FIXTURE

[75] Inventors: Robert Duncan, Fork Township, Lexington County; Wade H. Widener, Cayce, both of S.C.

[73] Assignee: Westinghouse Electric Corp., Pittsburgh, Pa.

[21] Appl. No.: 809,703

[22] Filed: Dec. 17, 1985

[51] Int. Cl.$^4$ ................................................ B25B 1/20
[52] U.S. Cl. ...................................... 269/41; 269/118; 376/438; 376/462; 228/49.4
[58] Field of Search .................. 228/49.4; 269/41, 49, 269/118; 376/261, 462, 438

[56] References Cited

U.S. PATENT DOCUMENTS 4,492,844  1/1985  Kobuck et al.
4,519,593  5/1985  Kobuck et al.

FOREIGN PATENT DOCUMENTS 736946  7/1943  Fed. Rep. of Germany ........ 269/49
603890  6/1948  United Kingdom ................... 269/49

Primary Examiner—John F. Terapane
Assistant Examiner—John S. Maples

[57] ABSTRACT

An improved retention strap for maintaining a fuel assembly grid in an assembled condition during manufacture in a grid assembly fixture includes four members extendible along the respective outer grid straps, between the corners and about the periphery of the grid. Each member has a pair of end posts and a cross member extending between and connected with the end posts. The end posts of the members are disposed adjacent the respective corners of the grid when the grid is in the assembled condition. Pairs of brackets interconnect respective ones of the end posts of the members, whereas pairs of releasable connectors fasten respective others of the end posts of the members so as to form diagonally opposite pairs of substantially rigidly squared first fixed and second openable corners. Also, the retention strap includes a pair of clamps disposed at each of the fixed and openable corners formed by the end posts. The clamps are engagable with a selected one of the end portions of the outer grid straps forming the respective grid corner disposed adjacent one of the squared corners of the retention strap. The outer grid strap end portion selected is the one having a terminal edge defining the inner part of the lap joint at the grid corner. The clamps have inner hook-shaped elements which engage on the selected end portion to pull outwardly thereon and thereby pull outwardly on the other end portion of the pair thereof forming the grid corner which secures the end portions against the respective one of the squared corners of the retention strap and thereby prevents distortion of the grid corner during welding of each respective lap joint at a corner of the grid. Each clamp also has a second adjustable element adapted to bear against the retention strap member and exert an outwardly-directed pulling force on the outer grid strap end portion via the first element thereon.

7 Claims, 6 Drawing Figures

RETENTION STRAP IN A GRID ASSEMBLY FIXTURE

BACKGROUND OF THE INVENTION

1. Field of the Invention

The present invention relates generally to fuel assemblies for nuclear reactors and, more particularly, is concerned with an improved retention strap for a grid assembly fixture which permits assembling a grid having corner cells of proper squareness and size.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control rod guide thimbles of the fuel assembly. Top and bottom nozzles on opposite ends of the fuel assembly are secured to the guide thimbles which extend slightly above and below the ends of the fuel rods.

The grids as well known in the art are used to precisely maintain the spacing between the fuel rods in the reactor core, prevent rod vibration, provide lateral support for the fuel rods, and, to some extent, frictionally retain the rods against longitudinal movement. Conventional designs of grids include a multiplicity of interleaved inner straps having an egg-crate configuration designed to form cells which individually accept the fuel rods and control rod guide thimbles. The cells of each grid which accept and support the fuel rods at a given axial location therealong typically use relatively resilient springs and relatively rigid protrusions (called dimples) formed into the metal of the interleaved straps. The springs and dimples of each grid cell frictionally engage or contact the respective fuel rod extending through the cell. Additionally, outer straps are attached together and peripherally enclose the inner straps to impart strength and rigidity to the grid. The outer straps conventionally have springs integrally formed into the metal thereof which project into respective ones of the cells disposed along the perimeter of the grid.

Over the years, the manufacture of a fuel assembly grid has been an intricate and time consuming operation. However, just recently a grid assembly fixture has been developed which has helped overall to improve grid manufacture by permitting relatively rapid assembly of the inner and outer grid straps without causing undue bending thereof. Such grid assembly fixture is described and illustrated in U.S. Pat. Nos. 4,492,844 and 4,519,593 to Richard M. Kobuck et al and assigned to the assignee of the present invention. The fixture is not only used to accurately assemble the grid straps to form the grid but also provides the means by which the straps of the assembled grid are retained together during subsequent welding thereof. The fixture includes a retention strap composed of four generally H-shaped bars, each bar including a cross member interconnecting a pair of end posts. The opposite end posts of the retention strap bars are connected together adjacent to the corners of the assembled grid so that the retention strap will extend about the periphery thereof and hold the grid straps in assembled relationship on the fixture. Each bar at its opposite end posts is respectively hingedly fastened and releasably fastened to the posts of the adjacent bars. The bars further have screws adjacent their respective posts for providing adjustment in the amount of an inwardly-directed clamping force applied to the assembled grid at the corners thereof by the retention strap. Also, pins (not shown in the referenced patents) are disposed through the corner grid cells, in engagement with the springs and dimples therein, for the purpose of maintaining the corner cell size, squareness and dimple perpendicularity.

Notwithstanding the overall benefits fostered by the grid assembly fixture of the aforesaid patents, the outer retention strap of the fixture has generally failed to maintain grid corner cell size, squareness and dimple perpendicularity specifications at the desired standards. The inwardly-directed clamping force applied by the retention strap to the grid corners is transferred via the pins against the dimples to the adjacent inner straps which contain the dimples and comprise the cell walls. Such force causes deflection and distortion of the cell inner walls. The outer walls of the corner cells also tend to distort inward during the corner seam or joint welding operation which results in an undersized cell condition. Both of these conditions require an additional repair operation to correct cell distortion in order for the grid to meet minimum envelope standards at the corner.

Consequently, a need exists for improvement of the above-described grid assembly fixture in a way which will enhance production efforts to hold desired grid cell size, dimple perpendicularity and corner squareness and thereby maintain minimum envelope requirements at the corners and eliminate the necessity for corrective measures.

SUMMARY OF THE INVENTION

The present invention provides an improved retention strap designed to satisfy the aforementioned needs. The retention strap of the invention employs clamps at each of the squared corners thereof which engage the outer grid straps adjacent the grid corners and pull them outward securely against the squared corners of the retention strap. Then, during welding operations when the straps are rigidly attached together at the respective grid corners, the squareness and size of the corner grid cells and the envelope of the grid are maintained within acceptable standards since no force is applied to the cell dimples and inward movement of the cell straps is prevented by the outward pull imposed thereon. Therefore, the need for the post-manufacture corrective measures is eliminated. In addition, the improved retention strap eliminates loose parts used in the current fixture and is easily removed after use.

Accordingly, the present invention is directed to an improved retention strap for maintaining a fuel assembly grid in an assembled condition during its manufacture. The fuel assembly grid has outer grid straps defining the periphery of the grid and having respective opposite end portions which together form a plurality of corners of the grid. The retention strap comprises: (a) a plurality of members extending along the respective outer grid straps, between respective corners and about the periphery of the grid when the grid is in the assembled condition; (b) means interconnecting the members so as to form a plurality of substantially squared corners located generally outwardly of and adjacent to the corners of the grid; and (c) means mounted at the squared corners being operable for engaging selected ones of the end portions of the outer grid straps forming the respective corners of the grid to pull outwardly on the end portions and secure them respectively adjacent the squared corners of the retention strap in order to prevent distortion of the grid corners during welding of the respective corner grid strap end portions to form the grid corners.

More particularly, the operable means is a plurality of clamps each having a stem mounted through one of the members adjacent each of the corners formed by the end portions of the outer grid straps. The stem has a first element at an inner end thereof adapted to hook on the selected one of the end portions of the respective outer grid straps forming the corner and a second element adjustable along an opposite outer end thereof adapted to bear against the member and exert an outwardly-directed pulling force on the outer grid strap end portion via the first element thereon. The end portions of the outer grid straps overlap one another in forming the grid corner so that the first element of the clamp engages only the inner one of the outer grid strap end portions to secure them adjacent the respective squared corner of the retention strap. Further, the clamp stem is externally threaded and the second element is an internally threaded nut whose position can be threadably adjusted along the stem. Also, the first elemnt has a hook-like shape.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
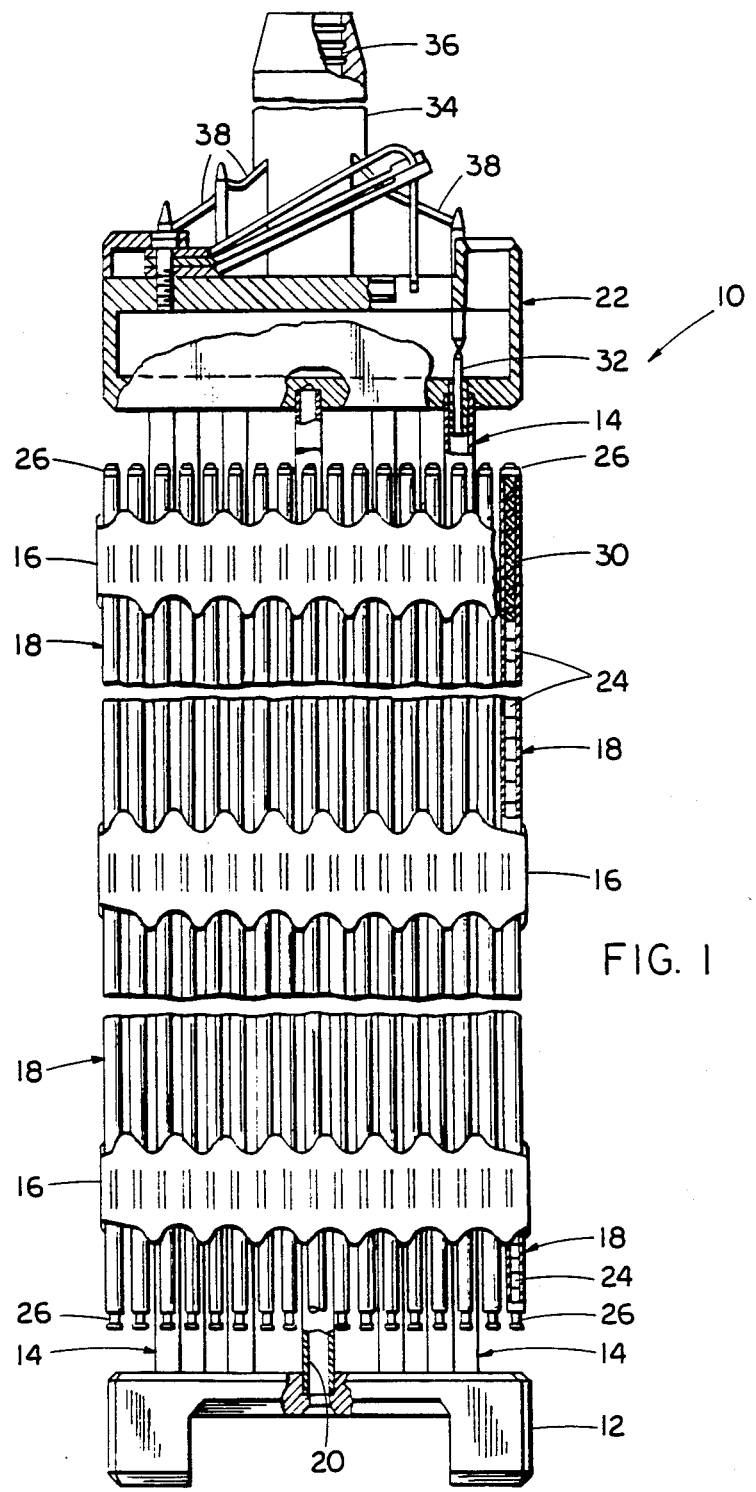
FIG. 1 is an elevational view, partly in section, of a nuclear fuel assembly having fuel rod support grids which can be manufactured using a grid assembly fixture which incorporates the improved retention strap of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings and particularly to FIG. 1, there is shown an elevational view of a fuel assembly, represented in vertically foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse support grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the support grids 16 spaced along the fuel assembly length. Each fuel rod 18 includes nuclear fuel pellets 24 and the opposite ends of the rod are closed by upper and lower end plugs 26 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/-coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 has operatively associated therewith a rod cluster control mechanism 34 having an internally threaded cylindrical member 36 with a plurality of radially extendings flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Improved Grid Assembly Fixture Retention Strap

Figure 4:
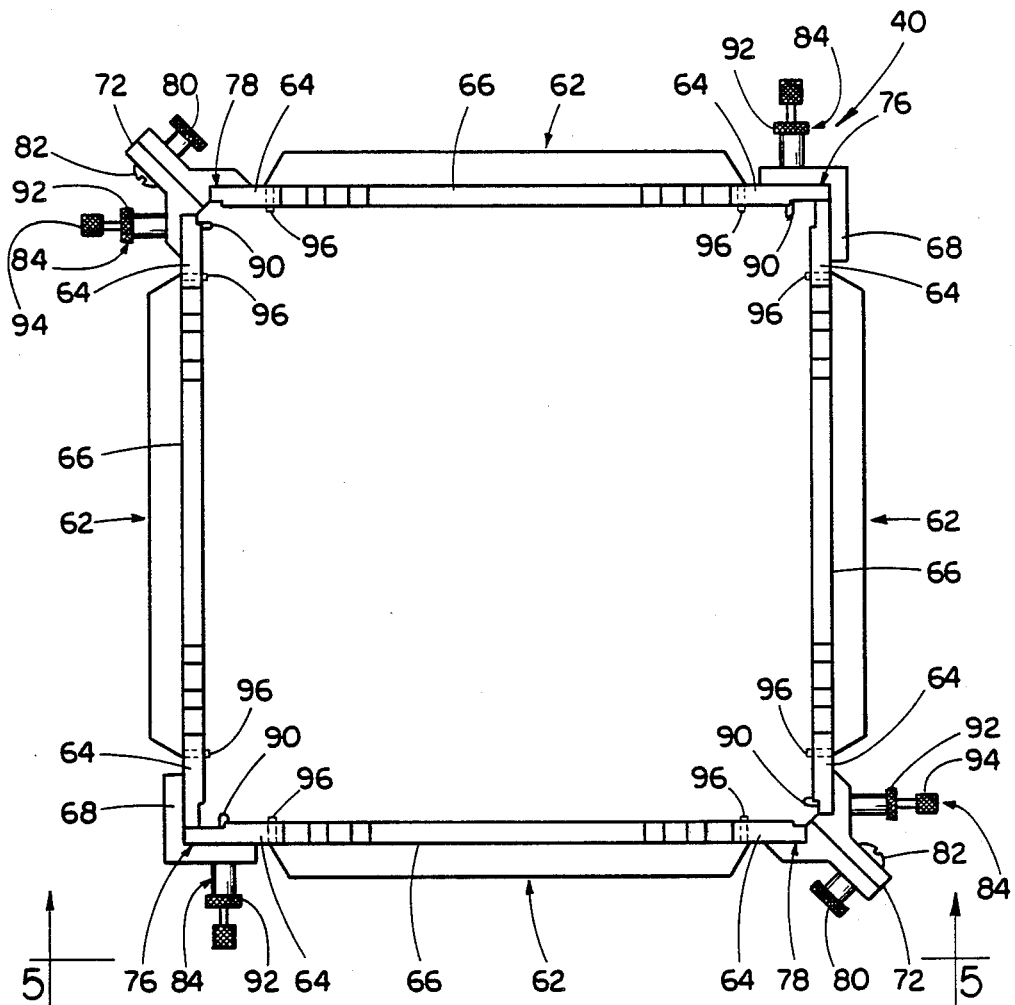
FIG. 4 is a top plan view of the improved retention strap of the present invention.
Figure 5:
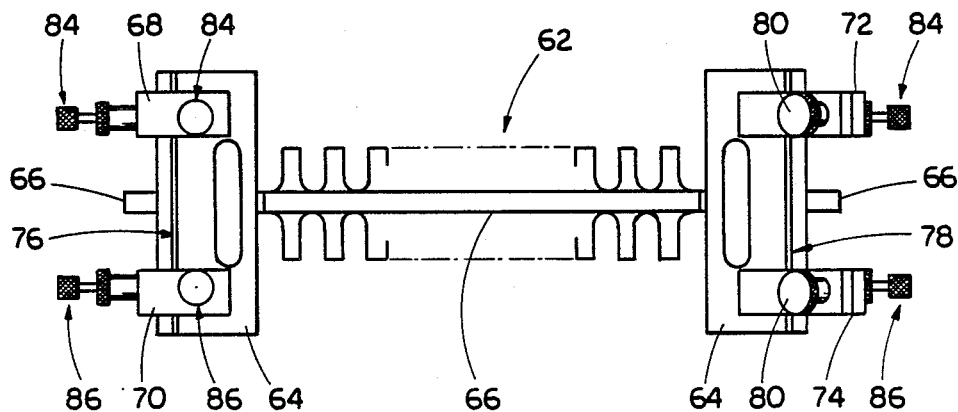
FIG. 5 is an end elevational view of the improved retention strap as seen along line 5—5 of FIG. 4.
Figure 6:
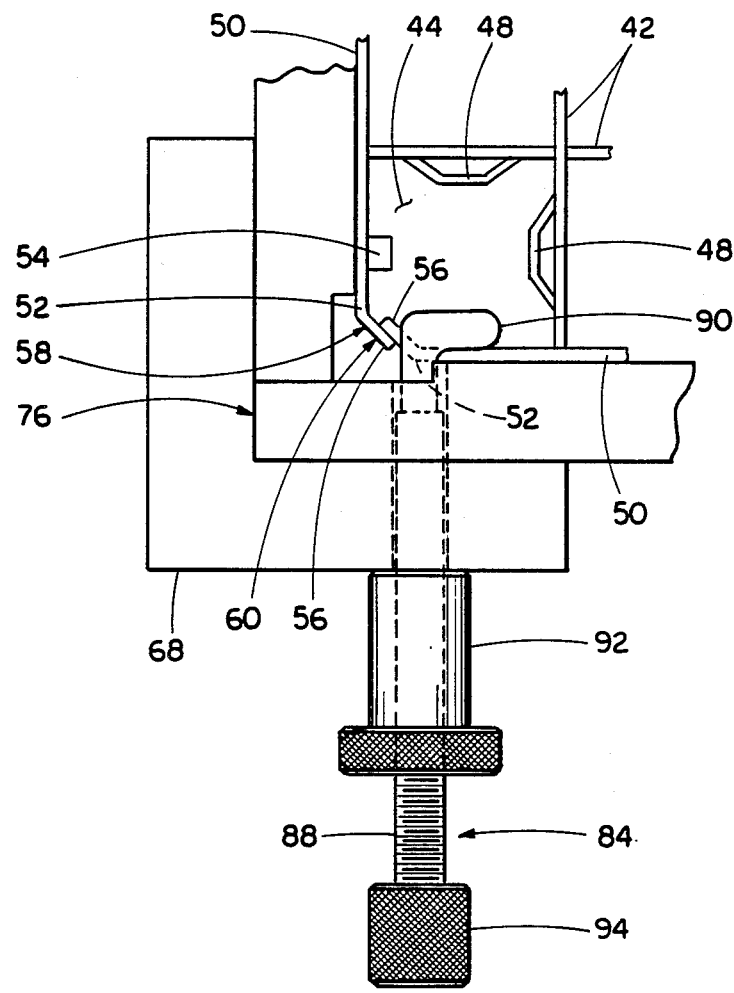
FIG. 6 is an enlarged fragementary detailed view of one corner of the improved retention strap of FIG. 4.

In FIGS. 4 through 6, there is shown an improved retention strap, generally designated 40 and comprising the preferred embodiment of the present invention, for maintaining the fuel rod support grid 16 in an assembled condition during manufacture in a grid assembly fixture (not shown), such as the one disclosed in the aforesaid patents. Thus, the retention strap 40 of the present invention constitutes an improvement upon the one used in the grid assembly fixture of the referenced patents.

Figure 2:
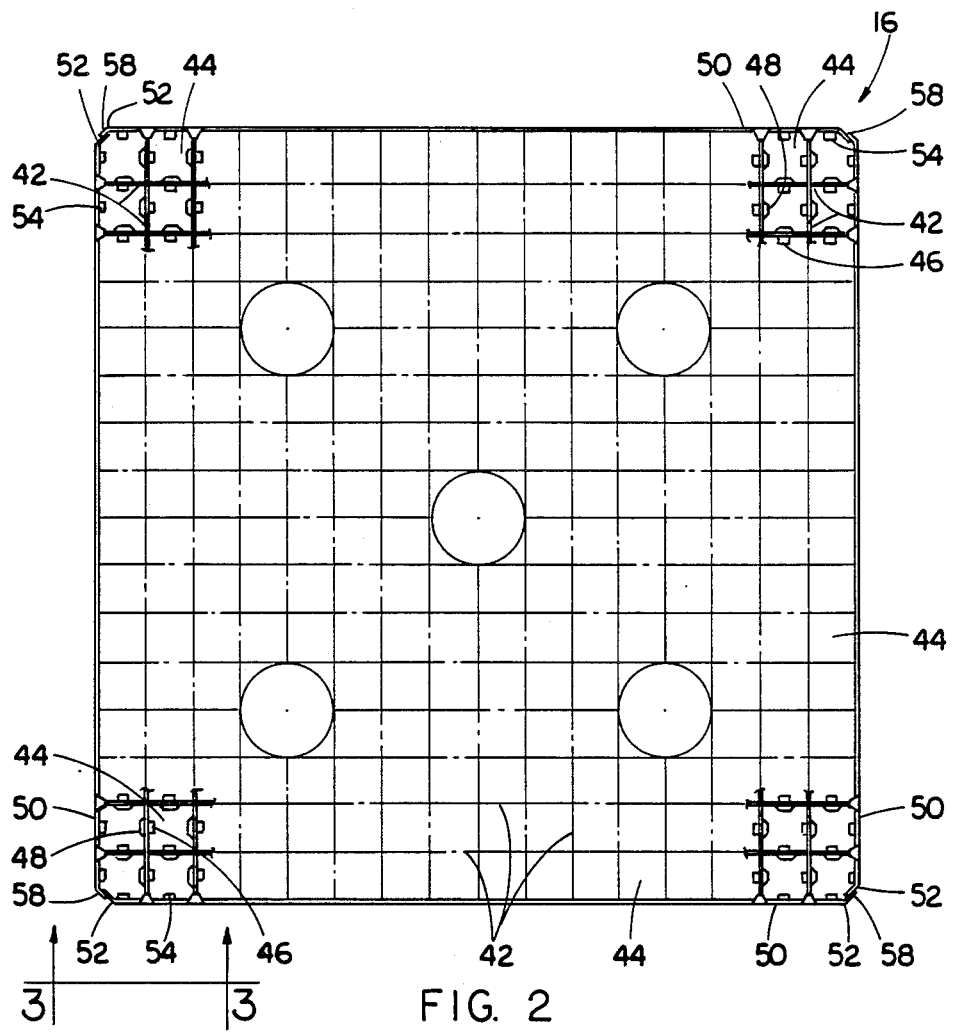
FIG. 2 is an enlarged top plan view of the support grid of FIG. 1, removed from the fuel assembly and showing four cells in each corner of the grid and the remainder thereof in phantom outline.

Turning first to FIG. 2, each fuel rod support grid 16 of the fuel assembly 10 of FIG. 1 basically includes a multiplicity of interleaved inner straps 42 having an egg-crate configuration designed to form cells 44. The cells of each grid 16 accepting and supporting the fuel rods 18 at a given axial location therealong typically use relatively resilient springs 46 and relatively rigid protrusions or dimples 48 (see also FIG. 6) formed in the metal of the interleaved inner straps 42 to generate the spring forces needed to hold the fuel rods 18 therein.

Figure 3:
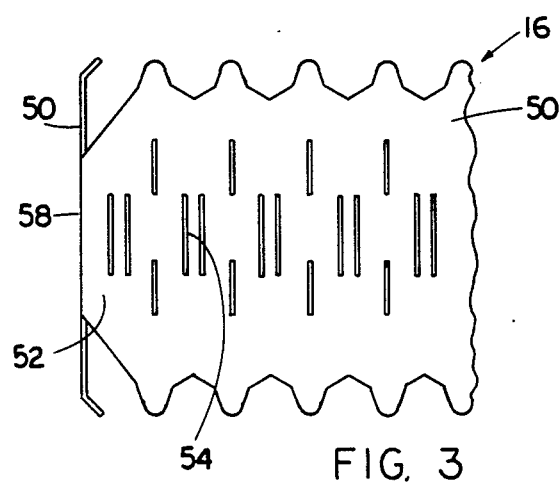
FIG. 3 is an enlarged fragmentary detailed elevational view of one corner of the grid as seen along the line 3—3 of FIG. 2.

As seen also in FIG. 3, in addition to FIG. 2, the support grid 16 also has outer straps 50 attached together at opposite end portions 52 thereof and peripherally enclosing and connected with the grid inner straps 42 to impart strength and rigidity to the grid 16. The outer straps 50 also conventionally have resilient springs 54 integrally formed into the metal thereof which project into respective ones of the cells disposed along the perimeter of the grid 16. Thus, the four outer grid straps 50 are arranged in a generally rectangular configuration defining the periphery of the grid 16. Their respective opposite end portions 52, having terminal edges 56, together form grid corners 58 in which the terminal edges 56 form inner and outer overlapping parts of the corner lap seams or joints 60.

Referring again to FIGS. 4 through 6, the improved retention strap 40 basically includes a plurality of members 62, preferably four in number, which extend along the outer grid straps 50, between respective grid corners 58 and about the periphery of the grid 16 when the grid is in the assembled condition. Each member 62 is composed of a pair of end posts 64 and a cross member 66 extending between and connected with the end posts. The end posts 64 of the members 62 are disposed adjacent the respective corners 58 of the grid 16 when the grid is in the assembled condition.

Also, the retention strap 40 has means interconnecting the members 62 so as to form a plurality of substantially squared corners, preferably four in number, being located generally outwardly of and adjacent to the corners 58 of the grid 16. In particularly, pairs of upper and lower angular brackets 68,70 interconnect respective ones of the end posts 64 of the retention strap members 62, whereas pairs of upper and lower releasable connectors 72,74 fasten respective others of the end posts 64 so as to form diagonally opposite pairs of substantially rigidly squared fixed and openable corners 76,78. The connectors 72,74 can be tightly connected together or released from engagement with one another by appropriate rotation of knobs 80 on screws 82 of the connectors. The releasable connectors 72,74 allow easy assembling and disassembling of the retention strap 40, while the halves of the retention strap formed by the pairs of members being fixedly interconnected by the angular brackets 68,70 determine and permanently retain the precise desired squareness of the retention strap whenever assembled.

Further, the retention strap 40 includes improved means mounted at the squared corners 76,78 being operable to secure the outer grid strap end portions 52 respectively adjacent the squared corners of the retention strap in order to prevent distortion of the grid corners 58 during welding of the respective outer grid strap end portions to form the grid corners. Preferably, such means takes the form of a pair of upper and lower screw clamps 84,86 being disposed at each of the fixed and openable squared corners 76,78 formed by the end posts 64.

Each screw clamp 84,86 has a stem 88 mounted through the end post 64 of one of the retention strap members 62 (as well as through one of the brackets 68,70 or connectors 72,74). The stem 88 extends generally perpendicular to a selected one of end portions 52 of the outer grid straps 50 forming each of the grid corners 58. The stem 88 has a first element 90 at an inner end thereof which has an hook-like shape adapting it to hook on the selected one of the outer grid strap end portions 52. Also, the stem 88 is externally threaded and has a second element 92 in the form of an internally threaded nut threadably mounted thereon. The position of the nut 92 can be adjusted along the stem 88 by appropriately rotating the nut. A knob 94 is fixed to the outer end of the stem 88 for use in rotating the stem to engage or disengage the hook-like inner element 90 on or from the outer grid strap end portion 52. It should be readily apparent that by appropriate rotation of the nut 92 it will be made to bear against the exterior side of the bracket 68 of the retention strap member 62 (via the respective bracket or connector) and exert an outwardly-directed pulling force on the selected one outer grid strap end portion 52 via the hook-like inner element 90 on the stem 88.

As described above, the clamps 84,86 are engagable with a selected one of the end portions 52 of the outer grid straps 50 forming each respective grid corner 58 which, in turn, is disposed adjacent one of the squared corners 76,78 of the retention strap 40. The outer grid strap end portion 52 selected is the one having the terminal edge 56 defining the inner part of the lap joint 60 at the grid corner 58. The inner hook-shaped elements 90 of the clamps 84,86 will engage on the selected end portion 52 to pull outwardly thereon and thereby pull outwardly (through the lap joint 60) on the other end portion 52 of the pair thereof forming the grid corner 58. As seen in FIG. 6, the location of engagement of the clamp element 90 with the inner one of the outer grid strap end portions 52 is displaced from the location of overlap at lap joint 60 of the end portions 52 of the outer grid straps 50 with one another. Such outwardly-directed pulling secures the end portions 52 adjacent the respective one of the squared corners 76,78 of the retention strap 40 and thereby prevents distortion of the grid corner 58 during welding of each respective lap seam or joint 60 at a corner of the grid.

It should be understood that the hook-like inner element 90 of the upper clamp 84 hooks over the selected one outer grid strap end portion 52, whereas the other hook-like inner element 90 of the lower clamp 86 hooks under the same selected one outer grid strap end portion 52. In addition, there is a pin 96 mounted to each of the end posts 64 spaced from the clamps 84 which hooks over the outer grid strap 50 also and thereby assists in retaining the outer grid straps 50 secured against the interior of the retention strap 40.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An improved retention strap for maintaining a fuel assembly grid in an assembled condition during manufacture thereof, said grid including outer grid straps defining the periphery of the grid and having respective opposite end portions which together in pairs at inner and outer terminal edges thereof overlap one another to form a plurality of corners of the grid, said retention strap comprising:

(a) a plurality of members extending along the respective outer grid straps, between respective corners and about the periphery of the grid when the grid is in the assembled condition;

(b) means interconnecting said members so as to form a plurality of substantially squared corners located generally outwardly of and adjacent to the corners of the grid; and (c) means mounted at said squared corners being operable for engaging selected ones of the end portions of the outer grid straps forming the respective corners of the grid to pull outwardly on the end portions and secure them respectively adjacent said squared corners of said retention strap in order to prevent distortion of the grid corners during welding of the respective outer grid strap end portions to form the grid corners;

(d) said operable means engaging only said ones of said outer grid strap end portions having said inner ones of said overlapped terminal edges thereon, the location of engagement of said operable means with said outer grid strap end portions being displaced from the location of overlap of said terminal edges with one another such that said engaged outer grid strap end portions can be secured by said operable means in contact adjacent said respective squared corners of said retention strap.

2. The retention strap as recited in claim 1, wherein said operable means is a plurality of clamps each having a stem mounted through one of said members adjacent each of the grid corners formed by the end portions of the outer grid straps, said stem having a first element at an inner end thereof adapted to hook on the selected one of the end portions of the respective outer grid straps forming the grid corner and a second element adjustable along an opposite outer end thereof adapted to bear against one of said members and exert an outwardly-directed pulling force on the outer grid strap end portion via said first element thereon.

3. The retention strap as recited in claim 2, wherein said stem is externally threaded and said second element is an internally threaded nut whose position can be threadably adjusted along said stem.

4. The retention strap as recited in claim 2, wherein said first element has a hook-like shape.

5. An improved retention strap for maintaining a fuel assembly grid in an assembled condition during manufacture thereof, said grid including outer grid straps defining the periphery of the grid and having respective opposite end portions which together in pairs at inner and outer terminal edges thereof overlap one another to form a plurality of corners of the grid, said retention strap comprising:

(a) first and second pairs of members extending along the respective outer grid straps, between respective corners and about the periphery of the grid when the grid is in the assembled condition;

(b) first bracket means rigidly interconnecting said members in said first pair thereof to form a substantially rigidly squared first fixed corner of said retention strap;

(c) second bracket means rigidly interconnecting said members in said second pair thereof to form a substantially rigidly squared second fixed corner of said retention strap being located diagonally opposite said first fixed corner;

(d) first connector means rigidly releasably fastening respective ones of said members of said first and second pairs thereof to form a substantially rigidly squared first openable corner of said retention strap;

(e) second connector means rigidly releasably fastening others of said members of said first and second pairs thereof to form a substantially rigidly squared second openable corner of said retention strap being located diagonally opposite said first openable corner; and (f) a pair of clamps mounted at each of said fixed and openable squared corners formed by said members and being openable for engaging selected ones of the end portions of the outer grid straps forming the respective corners of the grid to pull outwardly on the end portions and secure them respectively adjacent said squared fixed and openable corners of said retention strap in order to prevent distortion of the grid corners during welding of the respective outer grid strap end portions to form the grid corners;

(g) each clamp of said pair of clamps being mounted at each of said squared corners having a stem mounted through one of said members adjacent each of said grid corners formed by said end portions of said outer grid straps, said stem having a first element at an inner end thereof being adapted to hook on the selected one of said end portions of said respective outer grid straps forming said grid corner and a second element adjustable along an opposite outer end thereof being adapted to bear against one of said members and exert an outwardly directed pulling force on said outer grid strap end portion via said first element thereon;

(h) said first elements of said clamps engaging only said ones of said outer grid strap end portions having said inner ones of said overlapped terminal edges thereon, the location of engagement of said clamp first elements with said outer grid strap end portions being displaced from the location of overlap of said terminal edges with one another such that said engaged outer grid strap end portions can be secured by said clamp first elements adjacent said respective squared corners of said retention strap.

6. The retention strap as recited in claim 5, wherein said stem is externally threaded and said second element is an internally threaded nut whose position can be threadably adjusted along said stem.

7. The retention strap as recited in claim 5, wherein one of said first elements of said pair of clamps being mounted at each of said squared corners hooks over said selected one outer grid strap end portion, whereas the other of said first elements hooks under said selected one outer grid strap end portion.

* * * * *